United States Patent
Hardouin

(10) Patent No.: US 9,888,502 B2
(45) Date of Patent: Feb. 6, 2018

(54) METHOD FOR SIGNALING IN A CELLULAR TELECOMMUNICATIONS NETWORK

(71) Applicant: Orange, Paris (FR)

(72) Inventor: Eric Hardouin, Paris (FR)

(73) Assignee: ORANGE, Paris (FR)

( * ) Notice: Subject to any disclaimer, the term of this patent is extended or adjusted under 35 U.S.C. 154(b) by 110 days.

(21) Appl. No.: 14/778,566

(22) PCT Filed: Mar. 19, 2014

(86) PCT No.: PCT/FR2014/050634
§ 371 (c)(1),
(2) Date: Sep. 18, 2015

(87) PCT Pub. No.: WO2014/147341
PCT Pub. Date: Sep. 25, 2014

(65) Prior Publication Data
US 2016/0157277 A1    Jun. 2, 2016

(30) Foreign Application Priority Data

Mar. 19, 2013 (FR) ...................... 13 52455

(51) Int. Cl.
*H04W 76/02* (2009.01)
*H04W 74/00* (2009.01)
(Continued)

(52) U.S. Cl.
CPC ....... *H04W 76/021* (2013.01); *H04J 11/0059* (2013.01); *H04W 8/26* (2013.01);
(Continued)

(58) Field of Classification Search
CPC ............. H04W 76/021; H04W 74/006; H04W 28/048; H04W 72/042; H04W 8/26; H04W 72/082; H04J 11/0059
See application file for complete search history.

(56) References Cited

U.S. PATENT DOCUMENTS

2010/0035621 A1* 2/2010 Chun ................. H04W 72/042
455/450
2010/0255852 A1* 10/2010 Chen ................. H04W 72/082
455/450

(Continued)

FOREIGN PATENT DOCUMENTS

| WO | WO 2009/121025 | 10/2009 |
| WO | WO 2010/036006 | 4/2010 |
| WO | WO 2010/108136 | 9/2010 |

OTHER PUBLICATIONS

Nokia Siemens Networks, R1-090232: "Comparing performance, complexity and latency of SC-FDMA SIC and OFDM MLD", 3GPP TSG RAN WG1 Meeting, Ljublyana, Slovenia, Jan. 12-16, 2009 Agenda Item 12.1; pp. 14.

(Continued)

*Primary Examiner* — Mohammad Adhami
*Assistant Examiner* — Shailendra Kumar
(74) *Attorney, Agent, or Firm* — Knobbe, Martens, Olson & Bear, LLP

(57) ABSTRACT

A signaling method for implementation by a base station controlling at least one cell of a network attached to at least one terminal, uniquely identified on this cell by a dedicated temporary network identifier, is provided. It may comprise allocating an open temporary network identifier to an interferer terminal identified by the base station as being capable of interfering with at least one communication established by another terminal attached to this cell or a neighbor cell, publishing this open temporary network identifier and sending a first physical control channel according to a predetermined format to the interferer terminal comprising a condensed representation of the open identifier, this first channel coded using the dedicated temporary network identifier of the interferer terminal. The method may comprise sending a second physical control channel to the interferer terminal allocating it transmission resources over the cellular network, coded using the open temporary network identifier.

19 Claims, 2 Drawing Sheets

(51) Int. Cl.
  *H04W 28/04* (2009.01)
  *H04J 11/00* (2006.01)
  *H04W 8/26* (2009.01)
  *H04W 72/04* (2009.01)
  *H04W 72/08* (2009.01)

(52) U.S. Cl.
  CPC ....... *H04W 28/048* (2013.01); *H04W 72/042* (2013.01); *H04W 74/006* (2013.01); *H04W 72/082* (2013.01)

(56) References Cited

U.S. PATENT DOCUMENTS

| | | | |
|---|---|---|---|
| 2011/0124360 A1* | 5/2011 | Sagfors | H04W 28/18 455/509 |
| 2012/0243462 A1* | 9/2012 | Bucknell | H04B 7/155 370/315 |
| 2013/0039202 A1 | 2/2013 | Feuersanger et al. | |
| 2016/0286431 A1 | 9/2016 | Hardouin | |

OTHER PUBLICATIONS

3GPP, "Evolved Universal Terrestrial Radio Access (E-UTRA); Multiplexing and channel coding", Document TS 36.212 v11.1.0, Release 11, Dec. 2012; pp. 82.
3GPP, "Evolved Universal Radio Access (E-UTRA): Physical Layer Procedures (Release 11)", Document TS 36.213 v11.0,0, Release 11, Sep. 2012, Section 9.1.1.; pp. 143.
3GPP, "Evolved Universal Terrestrial Radio Access (E-UTRA); Radio Resource Control (RRC); Protocol Specification", (Release 11), Document TS 36.331 v11.2.0, Release 11, Dec. 2012; pp. 340.
3GPP, "Evolved Universal Terrestrial Radio Access Network (E-UTRAN); X2 application protocol (X2AP)" (Release 11), Document TS 36.423 v11.4,0, Mar. 2013; pp. 144.
3GPP, "Coordinated Multi-Point operation for LTE physical layer aspects", (Release 11), Document TR 36.819 v11.1.0; Dec. 2011; pp. 69.
International Search Report dated Jul. 25, 2014 for International Application No. PCT/FR2014/050634 filed Mar. 19, 2014, 5 pages.
International Search Report dated Jul. 25, 2014 for International Application No. PCT/FR2014/050644 filed Mar. 19, 2014, 5 pages.

* cited by examiner

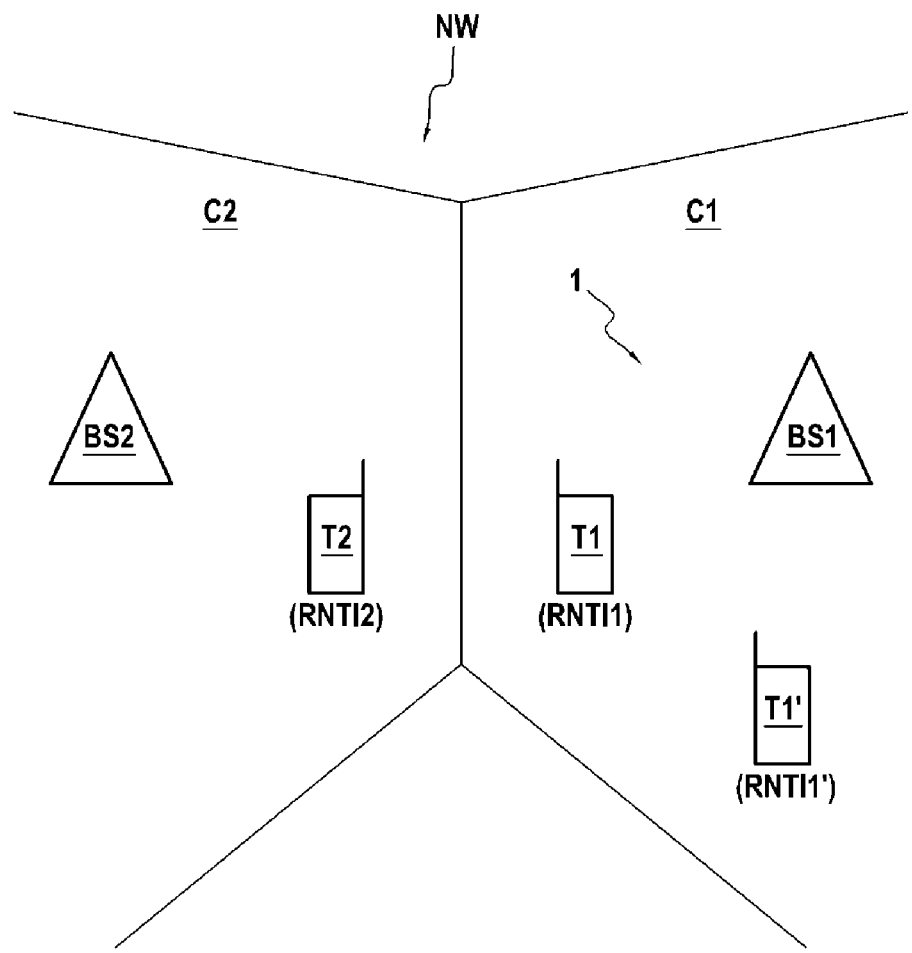
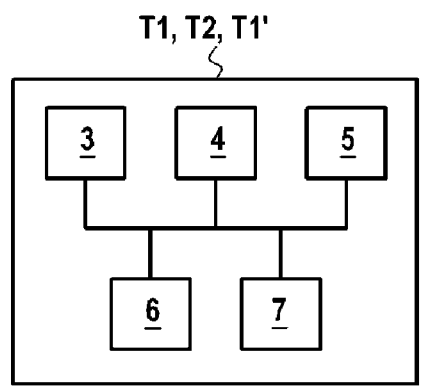
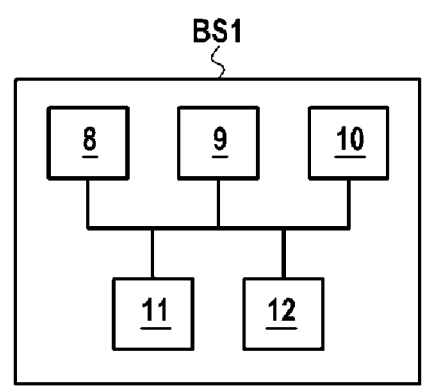
FIG.1
FIG.2
FIG.3

METHOD FOR SIGNALING IN A CELLULAR TELECOMMUNICATIONS NETWORK

RELATED APPLICATIONS

This application is the U.S. National Phase of Application No. PCT/FR2014/050634 entitled "METHOD FOR SIGNALLING IN A CELLULAR TELECOMMUNICATIONS NETWORK" filed Mar. 19, 2014, which designated the U.S., and which claims the benefit of French Application No. 1352455 Mar. 19, 2013.

BACKGROUND OF THE INVENTION

The invention relates to the general field of telecommunications.

It more particularly concerns the signaling, in a cellular telecommunications network, of resources allocated to a terminal to communicate over this network.

The invention thus has a favored, but not limiting, application in the context of LTE (Long Term Evolution) cellular mobile telecommunications networks as defined by the 3GPP (Third Generation Partnership Project), and notably on the downlink, i.e. in the direction of communication from the base station (or eNodeB) toward the mobile terminals (or UE for User Equipment).

In a known manner, the capacity of cellular mobile telecommunications networks, and in particular that of LTE networks, is limited by interference. This interference can be of different natures. Among the most damaging in terms of cellular network capacity, are

- SU-MIMO interference (for Single User-Multiple Input Multiple Output) related to the use of multiple transmitting and receiving antennas, and which corresponds to the interference generated between MIMO data streams allocated to one and the same terminal;
- MU-MIMO interference (for Multiple User-Multiple Input Multiple Output) which corresponds to the interference generated between MIMO data streams allocated to different terminals; and
- Intercellular interference, generated between signals emitted by different cells and intended for different terminals.

Various methods making it possible to reduce the effect of this interference on the performance of the network are known to the prior art.

Thus, interference of SU-MIMO and MU-MIMO type can notably be treated using a precoding technique applied to emission. This method consists in the application of complex weightings to the streams of data emitted by the antennas of the base station so as to attribute particular spatial properties thereto (for example a favored direction). Thus, for example, via this precoding it would be possible to separate in space the streams intended for one and the same terminal (in the SU-MIMO case) or to different terminals (in the MU-MIMO case) in order to allow the receiver terminal to detect each stream with a reduced interference from the other streams.

The intercellular interference can be reduced via the use of so-called CoMP (for Coordinated MultiPoint) techniques, aiming to coordinate the allocation of resources and the precoding implemented by the base stations controlling the neighboring cells of a given cell, so as to minimize the interference created on this cell by its neighbor cells. These techniques are described in more detail in the document TS 36.819 titled "Coordinated MultiPoint operation for LTE physical layer aspects", Release 11, edited by the 3GPP.

The most effective precoding techniques used to reduce MU-MIMO interference and/or intercellular interference require precise knowledge at the emitter of the transmission channel of the different terminals. Such knowledge is generally not available at the base station (eNodeB), because it requires considerable signaling on the return link between each terminal and the base station.

In order to limit this signaling, the information relating to the knowledge of the channel is generally quantified. There follows a loss of precision so that the interference is not in practice totally suppressed by precoding: a non-negligible proportion of residual interference subsists, which affects the terminal performance.

To remedy this drawback, it is known to use, at the terminals, non-linear receivers implementing interference cancellation, such as for example MMSE-SIC (for Successive Interference Cancellation) receivers. In general, for the sake of simplicity in the case of a single interferer, such a receiver estimates the interfering stream of data (corresponding to interference of MU-MIMO or intercellular type) for example by implementing a step of (channel) decoding of the signal of the corresponding interferer. Then based on this estimate of the stream, on the estimate of the channel of the interferer and on the knowledge of the transmission parameters allocated to this interferer, the receiver reconstructs the interfering signals received by the terminal. The reconstructed interfering signal is then subtracted from the signal received by the terminal, the signal thus cleansed of the interference being then used to detect the useful signal intended for the terminal.

SIC non-linear receivers can process one or more interfering data streams intended for one or more so-called interferer terminals. However, as stated previously, the process of cancelling the interference implemented by these non-linear receivers requires the knowledge of the transmission parameters of the interferer(s) and particularly, in the context of an LTE telecommunications network, of the modulation and coding scheme associated with each interferer, of the physical resource blocks (PRB), where applicable of the dedicated pilot sequence (known as DMRS for DeModulation Reference Signal) if it is used, and of the RNTI (Radio Network Temporary Identifier) allocated uniquely to the interferer terminal to identify it on the cell to which it is attached.

For these reasons, MMSE-SIC receivers with interference channel decoding are commonly envisioned to process SU-MIMO interference, since the terminal equipped with the MMSE-SIC receiver has access to all the transmission parameters of the various streams that are transmitted thereto. On the other hand, their use for processing MU-MIMO and downlink intercellular interference is more complex.

To better illustrate this statement, it is advisable to recall how the allocation of transmission parameters in an LTE network is carried out, and more particularly how the signaling of the transmission parameters thus allocated is carried out.

For the sake of simplicity, only intercellular interference will be addressed, knowing that equivalent statements also apply to MU-MIMO interference.

The transmission parameters are allocated to each terminal by the base station controlling the cell to which the terminal is attached. They are, with the exception of the RNTI identifier, communicated to each terminal via a dedicated PDCCH (Physical Downlink Control Channel). The RNTI identifier is signaled to the terminal in a dedicated signaling message, and more specifically in a configuration message transmitted over the PDSCH channel (Physical Downlink Shared Channel) managed by the upper layers of the network, and particularly by the RRC (for Radio Resource Control) layer.

The PDCCH channel is organized according to several possible formats, known as DCI (for Downlink Control Information) formats. A DCI format includes several fields, each field bearing a particular item of information (e.g. transport block or PRB (Physical Resource Block) allocated (one or two transport blocks can be allocated) MCSs (for Modulation and Coding Scheme) allocated for each transport block etc.). The information bits of a PDCCH channel (i.e. the bits of the DCI format) are then associated with a CRC (Cyclic Redundancy Check) code to allow error detection. The peculiarity of this CRC code is that it is scrambled with the RNTI identifier of the terminal to which the PDCCH channel is intended. This allows the terminal to validate that the PDCCH channel it is decoding is indeed addressed to it Specifically, if another terminal (which possesses a different RNTI) attempts to verify the validity of the PDCCH channel using this other identifier RNTI, the verification of the CRC code returns an error thereto.

The information bits as well as the bits of the CRC are then encoded using a convolutional code, then scrambled by a sequence specific to the cell, before being modulated in QPSK then transmitted. The effective rate of the convolutional code, which depends on the rate of the code as well as the data rate adaptation carried out at the output of the encoder to adapt the number of coded bits to the resources available, is adapted to the protection level required by the radio conditions of the terminal to which the PDCCH channel is intended. Thus, a PDCCH channel intended for a terminal that is in good radio conditions (for example close to the base station serving it) does not need much protection and is transmitted with a high effective rate, or in other words over a low number of resources. Conversely, a terminal in poor radio conditions, is allocated a PDCCH channel with a low effective rate, and occupying a higher number of resources.

In LTE networks, the resources occupied by a PDCCH channel allocated to a terminal are not known in advance by the latter. The terminal must therefore test a set of possible resource combinations, and for each candidate combination attempt to decode a PDCCH channel potentially transmitted over these resources with its RNTI identifier, to determine if it is intended for it. All the candidate resources for a given terminal is called a search space, and described in document 3GPP TS 36.213 v11.0.0 titled "Evolved Universal Radio Access; Physical Layer Procedures (Release 11)", September 2012, in section 9.1.1 in particular. The position of the search space depends in particular on the value of the RNTI.

It will thus be understood that the only possible solution for allowing a terminal suffering intercellular or MU-MIMO interference to acquire the knowledge of the transmission parameters of its interferers in order to be able to implement an MMSE-SIC processing method to cancel this interference, is to attempt to decode in a blind manner all the PDCCH channels of the interfering cell(s) (i.e. of the cells serving interferer terminals for the terminal equipped with the MMSE-SIC receiver).

In other words, for each interfering cell, the "victim" terminal must examine each PDCCH channel likely to have been transmitted over resources of search spaces corresponding to different values of RNTI, until all the PDCCH channels effectively transmitted are found. As the victim terminal does not have knowledge of the RNTI identifiers allocated to the other terminals, a test of all the possible RNTI values must be carried out. Once all the PDCCH transmitted by the interfering cell in question are decoded, the victim terminal can know which are the terminals of this cell that are served on the same resources as it and which represent interferers for it. In addition, the victim terminal has access to the transmission parameters of its interferers and can thus cancel their interference using an MMSE-SIC technique.

This solution has two major drawbacks.

First of all, the blind decoding of the various PDCCH channels of a cell is a very complex and particularly long operation due to the processing implemented. It is moreover a great consumer of energy of the terminal battery. The further application of such a blind decoding to several interfering cells to allow the use of a MMSE-SIC processing with a view to eliminating the inter-cellular interference is all the harder to envision.

In addition, the need to test for each candidate PDCCH all the possible values for the RNTI identifier (there are $2^{16}$), in order to determine both the latter and the validity of the candidate PDCCH, renders this method almost impossible to implement with realistic computation means.

The document WO 2010/108136 proposes a method making it possible to facilitate the cancellation of intercellular interference in a mobile telecommunications network, and particularly in an LTE network.

This method consists in dividing all the RNTI temporary identifiers available for a cell into two subsets: a first subset of RNTI identifiers (that will be named in "open" RNTIs in the remainder of this document) intended for terminals liable to cause interference, and a second subset of RNTI identifiers intended for terminals liable to suffer interference. The open RNTI identifiers of the first subset are published (i.e. broadcast), so as to be known to the terminals of the neighbor cells. Each open RNTI identifier uniquely identifies a terminal.

Thus, a base station of a cell wishing to perform the transmission from a PDCCH channel toward an interferer terminal decodable by a terminal of a neighbor cell can use to do this an open RNTI identifier. The decoding of the PDCCH channels by a terminal that is a victim of interference to acquire the transmission parameters of its interferers is therefore facilitated since it can be limited to open RNTIs published by the cells, as well as to the corresponding search spaces.

Document WO 2010/108136 proposes to signal to a terminal that one (or more) open RNTI identifier has or have been allocated to it, by sending this open RNTI identifier to it via the PDCCH control channel or via a shared physical channel or PDSCH (Physical Downlink Shared CHannel). On receiving this identifier, the terminal in question can than decode the PDCCH channels that are intended for it using the open RNTI identifier that has been allocated to it.

Such a signaling method can turn out to be costly in terms of signaling resources, particularly when a large number of open RNTI identifiers is allocated, each RNTI being coded on 16 bits as per the LTE standard. Specifically, a signaling of an open RNTI via a PDCCH channel involves adding the 16 bits of the open RNTI to the DCI format of this PDCCH channel, which diminishes the coverage of the PDCCH channel, particularly when the terminal is at the cell edge and is already using the most robust PDCCH format (i.e. that which occupies the maximum number of resources that can be allocated to a PDCCH channel).

This is all the more so when the "interferer" status of a terminal in the same may as the resources that are allocated to it are likely to evolve rapidly over time, and thus to require a high degree of signaling.

Moreover, as mentioned previously, according to this method, an open RNTI identifier uniquely identifies an interferer terminal. However, the number of terminals served by a base station of a cell can be high (several tens or even hundreds of terminal). The allocation of a large number of open RNTI identifiers by a base station of a cell thus leads to high computational complexity for the decoding of the associated PDCCH channels, as well as high energy consumption for the terminals implementing a successive interference cancellation method.

SUBJECT AND SUMMARY OF THE INVENTION

The invention notably makes it possible to palliate the aforementioned drawbacks by proposing a signaling method, intended to be implemented by a base station of a cellular telecommunications network, this base station controlling at least one cell of the network to which is attached at least one terminal uniquely identified on this cell by a so-called dedicated temporary network identifier, the signaling method comprising:
- a step of allocating a so-called open temporary network identifier, to a so-called interferer terminal identified by the base station from among said at least one terminal attached to the cell, as being capable of interfering (i.e. likely to interfere) with at least one communication established by another terminal attached to this cell or to a neighbor cell of this cell;
- a step of publishing this open temporary network identifier;
- a step of sending a first physical control channel according to a predetermined format to the interferer terminal, comprising a condensed (i.e. shortened) representation of the open temporary network identifier allocated to the interferer terminal, this first physical channel being coded using the dedicated temporary network identifier of the interferer terminal; and
- a step of sending a second physical control channel to the interferer terminal, allocating it transmission resources over the cellular network, this second channel being coded using the open temporary network identifier.

Correlatively, the invention also provides a base station of a cellular telecommunications network, controlling at least one cell of the network to which is attached at least one terminal uniquely identified on this cell by a so-called dedicated temporary network identifier, this base station comprising:
- a module for allocating a so-called open temporary network identifier to a so-called interferer terminal identified from among said at least one terminal attached to the cell as being capable of interfering with at least one communication established by another terminal attached to this cell or to a neighbor cell;
- a module for publishing this open temporary network identifier;
- a module for sending a first physical control channel according to a predetermined format to the interferer terminal, comprising a condensed representation of this open temporary network identifier, this sending module being capable of coding the first physical channel using the dedicated temporary network identifier of the interferer terminal; and
- a module for sending a second physical control channel to the interferer terminal allocating to it transmission resources over the cellular network, this sending module being capable of coding the second physical channel using the open temporary network identifier allocated to the interferer terminal.

For the sake of simplicity, it will be considered that a terminal is an interferer terminal capable of interfering with a communication established by another terminal (as named "victim" terminal), when the transmissions towards the interferer terminal originating from the cell to which it is attached (or more precisely originating from the base station controlling this cell) constitute interference signals for a communication established by the victim terminal.

The term "publication of an open temporary network identifier" is understood to mean the fact of bearing this open temporary network identifier to the knowledge of other terminals (and/or neighbor base stations), in other words to make it public or broadcast it, so that these terminals can decode the physical control channel (e.g. PDCCH channel) associated with this identifier (in other words, coded with this identifier), and thus determine the transmission parameters allocated over a transmission time interval (TTI) to the terminal to which this open temporary network identifier is allocated, in order to suppress the interference generated by the transmission from the cellular network toward the latter using for example a successive interference cancellation method. This publication can be done separately for each open identifier allocated to an interferer terminal, or in a variant, in a grouped way, i.e. all the open network identifiers selected by a base station for a cell can be published simultaneously.

For this purpose, the step of publishing the open temporary network identifier can in particular comprise broadcasting this identifier to the terminals attached to the cell controlled by the base station, for example via system information broadcast by the base station within the cell over a shared physical channel (e.g. PDSCH channel).

This variant allows the terminals attached to the same cell as the interferer terminal to quickly identify the transmission parameters of this terminal (in particular the resources allocated to this terminal) by limiting their search to the physical control channels coded by this open identifier, and to thus be able to implement a successive interference cancellation in order to eliminate the MU-MIMO interference generated by this interferer terminal.

In a variant, the step of publishing the open temporary network identifier can comprise broadcasting this identifier to the terminals attached to at least one other cell controlled by the same base station, and neighbor of the cell serving the interferer terminal.

According to yet another variant, the step of publishing the open temporary network identifier can comprise the broadcasting of this open identifier to at least one other base station controlling a neighbor cell of the cell serving the interferer terminal (typically to the neighbor cell or cells serving the interfered terminal or terminals).

This variant is particularly suitable for the suppression of intercellular interference.

In other words, the invention is applicable to both the suppression of MU-MIMO interference and the suppression of intercellular interference.

It proposes a configuration of an interferer terminal according to two temporary network identifiers, namely:
- according to a dedicated temporary network identifier, reserved to the interferer terminal and uniquely identifying the interferer terminal on the cell controlled by the base station, and according to an open temporary network identifier, likely to be shared by several interferer terminals.

To allow flexibility in the allocation of the physical control channels between the various interferer terminals, the invention advantageously proposes to signal dynamically to one of these interferer terminals that a physical control channel coded with an open temporary identifier is intended for it within a given transmission time interval (or TTI). For this purpose, the base station sends, in this TTI, a physical control channel (first channel in the sense of the invention) in a predetermined format intended for this interferer terminal, coded using its dedicated temporary network identifier, and containing a condensed representation of the open temporary network identifier allocated to this terminal.

The predetermined format of this first physical control channel indicates dynamically to the interferer terminal that a second physical control channel being intended for it is emitted in the same TTI. It also indicates to it which open temporary network identifier to use to determine over which search space to search for this second physical channel and decode it in order to identify which transmission resources are allocated to it for this TTI. The temporary network identifier used to code the second physical control channel being open and published to the other terminals of the cell and/or neighbor cells, it is possible at these other terminals to search and decode, at a reasonable complexity, this second physical control channel, and to cancel for example via a successive interference cancellation technique, the interference generated by the interferer terminal using the transmission parameters identified in this second channel.

Thus, the interfered terminals can restrict their search for physical control channels to the search space defined by this open temporary network identifier.

Moreover, several interferer terminals can share the same open temporary network identifier, the base station being able to determine dynamically which interferer terminal to serve on this open identifier at each TTI.

The solution proposed by the invention is consequently very flexible and makes it possible to adapt to a fast evolution of the interferer terminal/non-interferer terminal status of the terminals.

It moreover makes it possible to handle a large number of interferer terminals while also limiting the number of necessary open temporary identifiers, and thus the decoding complexity induced at the victim terminals. The number of open temporary identifiers to be defined results of course from a compromise between complexity, necessary signaling resources, and network performance.

Furthermore, the open temporary network identifier is advantageously transmitted to the interferer terminal according to a condensed representation (compared to the open temporary identifier strictly speaking), so as to limit the resources occupied in the first control channel to inform the interferer terminal of the open temporary identifier that is allocated to it. The term "condensed representation" is generally understood to mean an item of information of reduced size compared to the open temporary identifier that it represents.

By way of example, if the base station chooses to select from among the temporary network identifiers for a cell it controls, K temporary network identifiers intended to be open (in other words, published to the neighbor base stations and/or the terminals of the cell and the neighbor cells), a condensed representation of such an open temporary identifier can consist in a number between 1 and K (or in a binary representation of this number) uniquely designating this open identifier from among the K identifiers selected by the base station.

In a particular embodiment, the signaling method further comprises a step of broadcasting a message on the cell comprising a correspondence between the open temporary network identifier and its condensed representation.

This correspondence between the open temporary network identifier and its condensed representation can be published by the base station, for example in the system information or the signaling or configuration messages that it broadcasts over the cells that it controls, in particularly via a shared physical channel (e.g. PDSCH channel).

Note that the open temporary network identifier and the correspondence with its condensed form can be published by the base station in a same, unique message, or in separate messages.

In another variant embodiment, the correspondence between the open temporary network identifier and its condensed representation can be deduced by the interferer terminal from the publication of the open identifiers performed by the base station (for example, if this publication comprises the list of the K open temporary network identifiers mentioned previously, the order of the open identifiers in this list can be used to deduce a condensed representation, in the sense of the invention, of the open identifiers).

In yet another variant, this correspondence can be transmitted to the interferer terminal in a semistatic manner using a dedicated signaling message handled by the upper layers of the network, typically by the radio resource management layer of the network. This dedicated signaling message can be emitted particularly over a shared physical channel (e.g. PDSCH channel in an LTE network).

Note that the use of a condensed representation to designate the open temporary identifier allocated to the interferer terminal essentially has the aim of limiting the consumption of resources in the first physical control channel: it is on the other hand transparent for the victim terminals implementing an interference cancellation based on the transmission parameters and the resources allocated to the interferer terminal in the second physical channel.

The invention thus has a favored but non-limiting application when the cellular telecommunications network is an LTE network and:
 the open temporary network identifier and the dedicated temporary network identifier allocated to the interferer terminal are RNTI type identifiers;
 the first and second physical control channels are PDCCH channels; and
 where applicable, the dedicated signaling message comprising the correspondence between the open temporary network identifier and its condensed representation is an RRC (Radio Resource Control) signaling message.

In a particular embodiment of the invention, the predetermined format of the first physical control channel comprises a field containing a predetermined sequence of bits.

This sequence of bits is for example formed by a predetermined number of bits equal to 1.

The presence of this sequence makes it possible to easily identify that the first physical control channel indicates the existence of a second physical control channel intended for the interferer terminal and coded using the open temporary identifier allocated to this interferer terminal. The format of this first physical control channel can advantageously repeat the same number of bits as the formats existing for the physical control channels (for example the format 1A defined in the 3GPP LTE standard) in order not to require the implementation of an additional decoding operation beyond those already provided at each terminal to obtain the transmission parameters that are allocated to it.

In a variant, the formation of the first physical control channel comprises a number of bits below a format of the second physical control channel.

This variant, although requiring the implementation of a decoding operation adapted to this new format, makes it possible to reduce the radio resources necessary to signal the allocation of the open temporary network identifier to the interferer terminal, in practice it suffices to have a sequence including a number of bits making it possible to contain the condensed representation of each open temporary identifier.

The invention relies not only on the base station implementing a signaling method to inform an interferer terminal of an open temporary identifier that it has allocated to it, but also on the interferer terminal properly speaking which is capable of determining from a first control channel, taking a predetermined format and containing a representation of this open temporary identifier allocated by the base station, that a second control channel allocating it resources for communicating over the cellular network is intended for it and is coded according to this open temporary identifier.

According to another aspect, the invention also provides a communication method, intended to be implemented by an interferer terminal attached to a cell of a cellular telecommunications network and uniquely identified in this cell by a so-called dedicated temporary network identifier, this cell being controlled by a base station and the interferer terminal being capable of interfering with at least one communication established by another terminal of this cell or of a neighbor cell to this cell, the communication method comprising:

a step of decoding a first physical control channel using the dedicated temporary network identifier, this first physical control channel having a predetermined format and comprising a condensed representation of a so-called open temporary network identifier allocated to the interferer terminal by the base station and published or intended to be published by the latter;

on detection of the predetermined format of the first physical control channel:
  a step of determining the open temporary network identifier allocated to the interferer terminal from the condensed representation contained in the first physical channel; and
  a step of decoding a second physical control channel using the open temporary network identifier thus determined, this second physical control channel allocating transmission resources for transmission over the cellular network to the interferer terminal;

a step of using the transmission resources allocated in this second channel to communicate over the cellular network.

Correlatively, the invention also provides a terminal attached to a cell of a cellular telecommunications network and uniquely identified on this cell by a so-called dedicated temporary network identifier, this cell being controlled by a base station, this so-called interferer terminal being capable of interfering with at least one communication established by another terminal attached to this cell and/or to a neighbor cell to this cell, and comprising:

a module for decoding a first physical control channel using the dedicated temporary network identifier, this first physical control channel having a predetermined format and comprising a condensed representation of a so-called open temporary network identifier allocated to the interferer terminal and published or intended to be published by the base station;

a module, activated on detection of the predetermined format of the first physical control channel, for determining the open temporary network identifier from the condensed representation contained in the first physical control channel;

a module, activated on detection of the predetermined format of the first physical control channel, for decoding a second physical control channel using the open temporary network identifier determined by the determining module, this second physical control channel allocating transmission resources over the cellular network to the interferer terminal; and a module for using the transmission resources allocated in this second channel to communicated over the cellular network.

According to another feature, another aim of the invention is a system of a cellular telecommunications network comprising:

a base station in accordance with the invention controlling at least one cell of a cellular telecommunications network;

an interferer terminal in accordance with the invention attached to this cell; and a terminal interfered on by this interferer terminal, this interfered terminal being attached to the cell of the interferer terminal or to a neighbor cell of the network, and being capable of implementing an interference cancellation technique using the open temporary network identifier allocated to the interferer terminal and published by the base station.

The communication method, the terminal and the system benefit from advantages similar to the base station and the signaling method.

In a particular embodiment, the various steps of the signaling method and the communication method are determined by computer program instructions.

As a consequence, the invention also provides a computer program on an data storage medium, this program being able to be implemented in a base station or more generally in a computer, this program including instructions suitable for the implementation of the steps of a signaling method as described above.

The invention also provides a computer program on a data storage medium, this program being capable of being implemented in a terminal or more generally in a computer, this program including instructions suitable for the implementation of the steps of a communication method as described above.

Each of these programs can use any programming language, and be in the form of source code, object code, or intermediate code between source code and object code, such as in a partly compiled form, or in any other desirable form.

The invention also provides a computer readable data storage medium, and including instructions for a computer program as mentioned above.

The data storage medium can be any entity or device capable of storing the program. For example, the medium can include a storage means, such as a ROM, for example a CD ROM or a microelectronic circuit ROM, or else a magnetic recording means, for example a diskette (floppy disc) or a hard disc.

In addition, the data storage medium can be a transmissible medium such as an electrical or optical signal, which can be conveyed via an electrical or optical cable, by radio or by other means. The program in accordance with the invention can in particular be downloaded on a network of Internet type.

Alternatively, the data storage medium can be an integrated circuit wherein the program is incorporated, the circuit being suitable for executing or for being used in the execution of the method in question.

It is also possible to envisage, in other embodiments, that the signaling method, the communication method, the base station, the terminal and the system in accordance with the invention have in combination all or some of the aforementioned features.

BRIEF DESCRIPTION OF THE DRAWINGS

Other features and advantages of the present invention will become apparent from the description given below, with reference to the appended drawings which illustrate embodiments thereof which are in no way limiting in nature. In the figures:

FIG. 1 schematically represents a system of a telecommunications network, a base station and a terminal in accordance with the invention, in a particular embodiment;

FIGS. 2 and 3 schematically represent the hardware architecture of the base station and the terminal illustrated in FIG. 1;

DETAILED DESCRIPTION OF THE INVENTION

Figure 4:
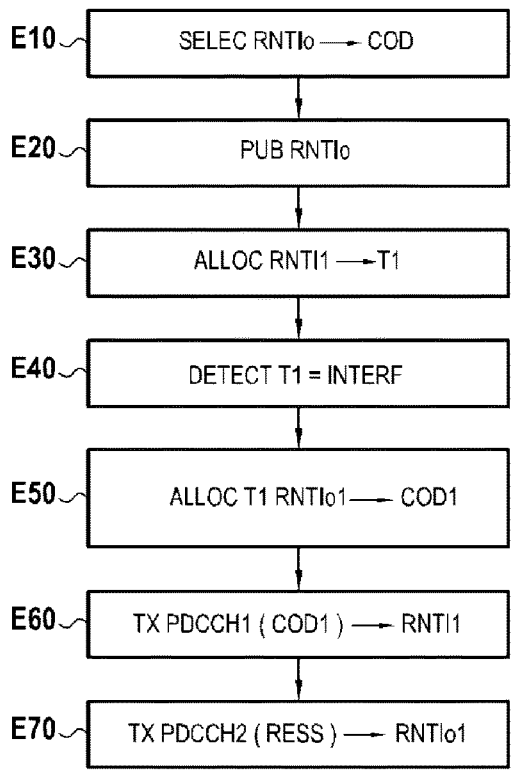
FIG. 4 represents, in the form of a block diagram, the main steps of a signaling method in accordance with the invention in a particular embodiment wherein it is implemented by the base station in FIG. 1.

FIG. 1 shows, in its environment, a system 1 of a cellular telecommunications network NW, in accordance with the invention, in a particular embodiment.

In this particular embodiment, the cellular telecommunications network NW is an LTE mobile network, as defined by 3GPP. Each cell of the network NW is controlled by a base station (or eNodeB) serving the various terminals (or UEs for User Equipments) attached to the cell.

By way of illustration, two cells C1 and C2 of the cell network NW are represented in FIG. 1, the cell C1 being controlled by the base station BS1 and the cell C2 being controlled by the base station BS2. Each base station serves one or more terminals present in the cell(s) that it controls. Thus, in FIG. 1, it is considered that a terminal T1 and a terminal T1' are attached to the cell C1 and served by the base station BS1, and that a terminal T2 is attached to the cell C2 and served by the base station BS2.

Of course no limitation is attached to the number of base stations under consideration, nor to the number of cells managed by a base station, nor even to the number of terminals attached to each cell.

In accordance with the LTE standard, each terminal attached to a cell is allocated a temporary network identifier known as RNTI by the base station controlling this cell, in order to communicate over the network NW. In a manner known to those skilled in the art, this RNTI identifier is a dedicated identifier, i.e. reserved to the terminal and which identifies it uniquely on the cell to which it is attached. Thus, in the example presently considered here, the base station BS1 allocates a dedicated temporary network identifier RNTI1 to the terminal T1 and a dedicated temporary network identifier RNTI1' to the terminal T1', and the base station BS2 allocates a dedicated temporary network identifier RNTI2 to the terminal T2.

To better illustrate the invention, it is assumed here that the terminal T1 is capable of interfering with communications on the network NW of the terminal T1' attached to the same cell as it, i.e. the cell C1 (by creating MU-MIMO interference for example), as well as with communications over the network NW of the terminal T2 attached to the cell C2 (intercellular interference). In other words, the terminal T1' and the terminal T2 are the victims of interference generated by the transmissions originating from the base station BS1 and intended for terminal T1.

Of course, these assumptions are not limiting per se, as a terminal can be an interferer terminal for certain terminals (i.e. the transmissions from the network toward this interferer terminal constitute interference for the communications established by these terminals), and undergo interference (i.e. be interfered on) generated by other terminals (i.e. by the transmissions from the network toward these other terminals).

In accordance with the invention, the system 1 comprises:
- at least one base station in accordance with the invention controlling at least one cell of the cellular telecommunications network. This base station is in the example presently considered here the base station BS1 that controls the cell C1;
- at least one interferer terminal attached to this cell, namely, in the example considered in FIG. 1, the terminal T1; and
- at least one terminal interfered on by this interferer terminal, and attached to the cell of the interferer terminal or to a neighbor cell of the network: in this case here, two interfered terminals are considered, namely terminals T1' and T2.

No limit is however attached to the numbers of interferer and interfered terminals in consideration, nor to the type of interference created by the interferer terminal. Thus the invention can apply as well in the presence of MU-MIMO interference generated within one and the same cell as described previously, and/or in the presence of intercellular interference between signals intended for terminals attached to neighbor cells, The terminals T1, T1' and T2 can be terminals of any kind capable of communicating over the LTE network NW, such as for example mobile phones, smartphones, laptop computers etc.

In the embodiment described here, for the sake of simplicity, the terminals T1, T1' and T2 are all LTE terminals in accordance with the invention, each being equipped with a non-linear receiver of MMSE-SIC type, or in other words with a non-linear receiver employing a successive interference cancellation technique. Such receivers are known per se and will not be further described here: thus, by way of example, they may be non-linear receivers employing hard decision channel decoding, or non-linear receivers employing soft decision turbo (or iterative) channel decoding, as notably described in the contribution R1-090232, 3GPP TSG RAN WG1, of January 2009 entitled "Comparing performance, complexity and latency of SC-FDMA SIC and OFDM MLD".

In the embodiment described here, these terminals have the hardware architecture of a computer, as illustrated in FIG. 2.

More specifically, each terminal notably comprises a processor 3, a read-only memory 4, a random-access memory 5, a non-volatile memory 6 and means 7 for communicating over the LTE telecommunications network NW, known per se.

The read-only memory 4 of each terminal forms a storage medium in accordance with the invention, readable by the processor 3 and on which is stored a computer program including instructions for executing the steps of a communication method in accordance with the invention, the steps of which will be described later with reference to FIG. 5 in a particular embodiment.

This computer program defines, in an equivalent way, software and functional modules of the terminals T1, T1' and T2 capable of executing the various steps of the method of communication and of interacting with the components of the terminals described previously with reference to FIG. 2, such as notably a module for decoding a first physical control channel (in this case a first PDCCH channel for an LTE network) having a format predetermined using the dedicated temporary network identifier of the terminal in consideration, a module for determining an open temporary network identifier from a condensed representation contained in the first physical control channel, a module for decoding a second physical control channel allocating resources to the terminal using this open temporary network identifier and a module for using the transmission resources allocated in the second channel to communicate over the network.

Note that it is not necessary for the implementation of the invention that all terminals able to communicate over the network NW implement a nonlinear receiver using an interference cancellation technique.

Similarly, all terminals able to communicate over the network NW are not necessarily in accordance with the invention, in other words, configured so as to be able to decode the open temporary identifiers allocated by their respective base station in order to allow the other terminals to cancel the interference that they generate. Thus, in the example presently considered, it suffices that T1 is in accordance with the invention, and that the terminals T1' and T2 are able to decode a PDCCH channel coded using an open temporary identifier allocated by the base station BS1 to terminal T1, and to apply an interference cancellation method to the interfering signals emitted by the base station BS1 and intended for the terminal T1 using the transmission parameters obtained by decoding the PDCCH channel emitted by the base station BS1 over the cell C1.

As mentioned previously, the base station BS1 is in accordance with the invention.

In the embodiment described here, it possesses the hardware architecture of a computer, as illustrated in FIG. 3, and notably comprises a processor 8, a read-only memory 9, a random-access memory 10, a nonvolatile memory 11 and means 12 for communicating over the LTE telecommunications network NW, known per se. These communication means 12 in particular allow it to communicate first with the terminals attached to the cell C1 and where applicable, to other neighbor cells of the cell C1 controlled by the base station BS1, and secondly with the base stations of the neighbor cells, such as for example with the base station BS2 of the cell C2.

The read-only memory 9 of the base station BS1 forms a storage medium in accordance with the invention, readable by the processor 8 and on which is stored a computer program including instructions for executing the steps of a signaling method in accordance with the invention, the steps of which will be described later with reference to FIG. 4 in a particular embodiment.

This computer program defines, in an equivalent way, software and functional modules of the base station capable of executing the various steps of the method of signaling and of interacting with the components of the base station BS1 described previously with reference to FIG. 3. These software modules are in particular a module for allocating an open temporary network identifier RNTI to an interferer terminal (e.g. T1), a module for publishing this open temporary network identifier to the terminals of the cell C1 and/or neighbor cells of C1 controlled by the base station BS1, and/or to other base stations than station BS1 controlling neighbor cells of C1 (e.g. BS2), a module for sending a first physical control channel (PDCCH) according to a predetermined format to the interferer terminal comprising a condensed representation of the open temporary identifier and coded using the temporary identifier dedicated to the interferer terminal, and a module for sending a second physical control channel allocating transmission resources on the cellular network to the interferer terminal, this second channel being coded using the open temporary identifier allocated to the interferer terminal.

Figure 5:
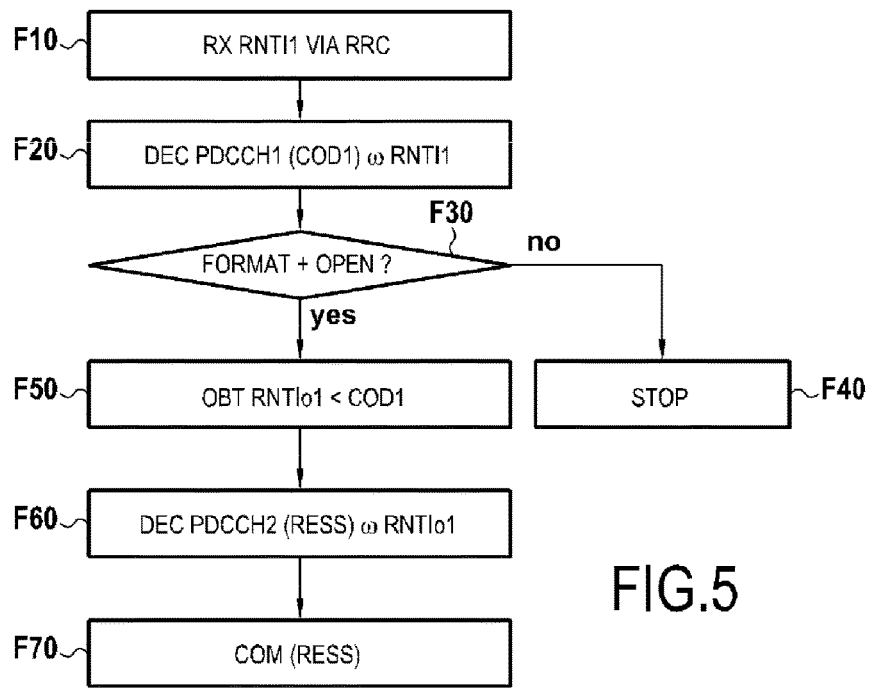
FIG. 5 represents, in the form of a block diagram, the main steps of a communication method in accordance with the invention in a particular embodiment wherein it is implemented by the base station in FIG. 1.

We will now describe with reference to FIGS. 4 and 5, the main steps of a method for signaling and a method for communicating in accordance with the invention, in a particular embodiment wherein these steps are implemented respectively by the base station BS1 and by the terminal T1 in FIG. 1.

As mentioned previously, it is assumed that the terminal T1 is an interferer terminal, in other words that it is capable by the intermediary of its communications with the base station BS1 of interfering with the communications established by other terminals over the network NW.

For the sake of simplicity, we will limit the description to an intercellular interference generated by the transmissions from the base station BS1 toward the terminal T1 attached to the cell C1 on the communications of the terminal T2 attached to the cell C1. The processing of MU-MIMO type interference capable of being generated by the transmissions intended for terminal T1 on the communications of the terminal T1' attached to the cell C1 is addressed later.

It is assumed that in a preliminary step, the base station BS1 selects, from among all the RNTI temporary identifiers available for the cell C1, a subset of so-called "open" RNTI identifiers, intended to be published to the neighbor cells and the terminals of cell C1 (step E10 in FIG. 4).

In the embodiment described here, the selected subset corresponds to a range comprising a limited number P of contiguous RNTI identifiers, for example 1, 4, 8 or 16 identifiers.

In accordance with the invention, each open temporary identifier $RNTIo_i$, i=1, . . . P, is represented in condensed (i.e. shortened, digest) form by a code $COD1, \ldots, CODP$ respectively.

This code corresponds for example to a binary representation of the rank occupied by each temporary identifier in the list of open identifiers selected by the base station BS1. For example here, if this list comprises P=8 elements, COD1="001" means that the open identifier in question is the first identifier of this list.

In a variant, other types of condensed representation can be considered as long as they make it possible to establish a unique correspondence with an open temporary identifier selected by the base BS1, and that they make it possible to limit the resources necessary for the representation of the open identifiers compared to these identifiers themselves (in other word for an RNTI identifier of 16 bits, a condensed representation of this identifier uses less than 16 bits).

In the embodiment described here, the base station BS1 broadcasts a message over the cell C1 (for example over a shared channel PDSCH) comprising the list of selected open identifiers RNTIoi, i=1, . . . P in correspondence with their condensed representations COD1, . . . . CODP.

This message is received by the set of terminals attached to the cell C1, and in particular by the terminals T1 and T1'. In this embodiment, by way of this message, the base station BS1 not only publishes the list of the open identifiers to the terminals of cell C1, but also informs these terminals (and particularly terminal T1) of the correspondence between the open identifiers and their condensed representations.

In the embodiment described here, the base station BS1 moreover publishes (i.e. broadcasts) the open RNTI identifiers selected to the base stations of the neighbor cells of the cell C1 and particularly to the base station BS2 (step E20).

As mentioned previously the term "publication" is understood to mean the fact of bearing the open RNTI temporary identifier to the knowledge of the other terminals, in other words to make them public, so as to facilitate the decoding by these other terminals of the PDCCH physical channels associated with these identifiers (in other words, coded with these identifiers), and thus determine the transmission parameters allocated to the terminals to which these open temporary network identifiers are allocated, in order to suppress the interference generated by them.

This publication is done here by the base station BS1 via the sending of a signaling message containing the list of selected open RNTI identifiers.

This signaling message can be emitted by the base station BS1 to the base stations of the neighbor cells over the interface X2 of the LTE network NW, given the definition of a new appropriate message. The interface X2 is known to those skilled in the art: its role is to allow the transport of data packets and items of control information between the base stations of the network NW. It is particularly described in the 3GPP document 36.423.

In a variant, the base station BS1 can emit the signaling message containing the list of selected open RNTI identifiers, over a connection of fiber point-to-point type established with the base stations of the neighbor cells (and in particular with the base station BS2).

In another embodiment wherein the base station BS1 controls several separate cells (including cell C1), the base station BS1 transmits a signaling message containing the list of open RNTI identifiers of the cell C1 to the terminals of the cells that it controls and which are neighbors of the cell C1. For this purpose, the base station BS1 relies for example on the signaling managed by the RRC layer for managing the radio resources of the network. This RRC layer is notably defined in document 3GPP TS 36.331 entitled "Evolved Universal Terrestrial Radio Access (E-UTRA); Radio Resource Control (RRC); Protocol Specification", Release 11, December 2012.

The signaling message then sent by the base station BS1 can be a system information message emitted independently to each cell controlled by the base station BS1 over a shared physical channel PDSCH. In this way, no network interface is needed for this signaling.

Note that the selection of a range of contiguous open RNTI identifiers allows more spectrally efficient signaling. Specifically, to signal the list of open RNTI identifiers selected by the base station BS1, it suffices that the signaling message emitted by the base station BS1 contains a number indicating the number of the first open RNTI identifier of the range, and of a number indicating the number of open RNTI identifiers selected by the base station BS1.

In a variant, the signaling message emitted by the base station BS1 to the base stations of the neighbor cells contains each open RNTI identifier selected by the base station BS1 and coded on 16 bits.

The list of open RNTI identifiers selected by the base station BS1 is received by the base stations of the neighbor cells, and notably by the base station BS2.

The base station BS2 (as well as the other base stations) then publishes in turn the list of open RNTI identifiers selected by the base station BS1, to the terminals attached to the cell C2, for example in a signaling message. This signaling message is for example a system information message emitted by the base station BS2 over a shared physical channel PDSCH.

Note that in the example considered here, we are limited to the cancellation of intercellular interference so that the open RNTI identifiers are signaled by the base station BS1 only to the base stations of the neighbor cells. When cancellation of MU-MIMO type interference generated within the cell C1 is also considered, the base station BS1 also publishes the selected open RNTI identifiers to the mobile terminals of its cell C1, for example by sending an RRC signaling message.

As described previously, in accordance with the LTE standard, the base station BS1 also allocates a dedicated temporary RNTI identifier to each terminal attached to its cell C1, making it possible to uniquely identify this terminal on the cell C1 (step E30). Thus, in the example considered here, it allocates the dedicated temporary identifier RNTI1 to the terminal T1. This identifier RNTI1 is, unlike the open RNTI identifiers selected in step E10, reserved for the terminal T1. It is chosen from among the RNTI identifiers available for the cell that have not been selected as open RNTI identifiers during step E10.

This dedicated identifier RNTI1 sent by the base station BS1 to the terminal T1 in a dedicated RRC signaling message (configuration message), in a manner known to those skilled in the art, and is received by the latter (step F10 in FIG. 5).

From that point:
   the base station BS1 can send to the terminal T1 physical channels PDCCH coded using this identifier RNTI1, particularly to signal to it the parameters and the transmission resources that it has allocated to it (including notably the allocated modulation and coding scheme, physical resource blocks PRB, dedicated DMRS pilot sequence), and
   the terminal TI monitors the search space defined by this identifier RNTI1, and can perform a valid decoding of the physical channels PDCCH that are intended for it and which are (en)coded using this identifier RNTI1 and use the transmission resources allocated in these PDCCH channels to communicate over the network NW.

The coding and decoding of the PDCCH physical channels using an RNTI identifier as well as the allocation of the parameters and transmission resources by the base station BS1 to the terminal T1 for an LTE network are described in more detail in the document TS 36.212 entitled "Evolved Universal Terrestrial Radio Access (E-UTRA); Multiplexing and channel coding", v11.1.0, Release 11, December 2012 and the document TS 36.213 previously mentioned and will not be further described here.

We will now assume that the base station BS1 determines that the terminal T1 is capable of creating interference toward neighbor cells (i.e. the transmissions from the base station BS1 towards the terminal T1 are capable of interfering with the communications of the terminals of the neighbor cells) and particularly toward the terminals of the cell BS2 (step E40), for example because the terminal T1 requests a radio resource-consuming service over a fairly long time period (e.g. stream broadcasting service) and will therefore occupy a wide bandwidth over a long time. In other words, it detects that the terminal T1 is an interferer terminal in accordance with the invention.

In a variant, other criteria can be considered at the base station BS1 for detecting that a terminal is capable of interfering with the communications of the terminals of the neighbor cells of cell C1 (or even of cell C1) such as for example the fact that the terminal is at the edge of the cell, etc. Such criteria are described in the document WO 2010/108136.

In a variant, the base station BS1 can detect that a terminal is capable of interfering with the communications of the terminals of the neighbor cells of the cell C1 using an exchange of information with the base stations controlling these neighbor cells. This detection can be carried out in each TTI when for example the base stations communicate over a connection of point-to-point fiber type. For example, the neighbor base station BS2 can then inform the base station BS1 of the planned use of certain radio resources by the terminal T2 in a future TTI, so that the base station BS1 knows that if it uses these resources for the terminal T1 in this future TTI, the transmission to the terminal T1 is capable of creating intercellular interference for the terminal T2.

Following this detection, the base station BS1 allocates to the terminal T1 an open RNTI identifier, denoted RNTIo1, chosen from among the open RNTI identifiers selected in step E10, and broadcast to the base stations of the neighbor cells to cell C1 and to the terminals attached to the other cells that it controls (step E50).

This identifier RNTIo1 is allocated to the terminal T1 along with its dedicated temporary identifier RNTI1. It is associated as previously described with a condensed representation, denoted COD1 (for example COD1="001").

To signal to the terminal T1 that the open temporary identifier RNTIo1 has been allocated to it the base station BS1 emits, in accordance with the invention, within a given transmission time interval or TTI, a first PDCCH physical channel, denoted PDCCH1, coded with the dedicated temporary identifier RNTI1 of the terminal T1 (step E60).

This first channel PDCCH1 advantageously has a particular predetermined DCI format, denoted by DCIo, which in itself expresses the fact that an open temporary identifier is allocated in this channel to the interferer terminal whose dedicated temporary identifier has been used to encode this channel.

For example, in this particular DCI format DCIo, the N first bits of this format DCIo of the first channel PDCCH1 are set to "1", N being a predetermined integer number chosen so as to avoid any ambiguity concerning the interpretation of this first channel.

The format DCIo of the first channel PDCCH1 further comprises a field, known as "Chp RNTIo", carried for example by the M bits following the N first bits set to "1", in which is found the condensed representation of the open temporary identifier associated with the interferer terminal to which the first channel PDCCH1 is intended.

Figure 6A:
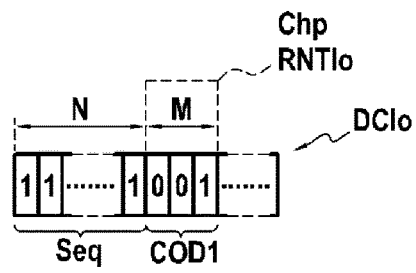
FIGS. 6A and 6B present examples of predetermined formats of the physical control channel which can be used in the context of the invention.

An example of such a format DCIo is illustrated in FIG. 6A, for the interferer terminal T1.

In accordance with this example, the format DCIo of the channel PDCCH1 contains N first bits set to "1" corresponding to a predetermined sequence Seq, followed by M=3 bits corresponding to the condensed representation COD1="001" of the open temporary identifier RNTIo1 allocated to the terminal T1 by the base station BS1, this condensed representation being contained in the field "Chp RNTIo".

In the embodiment described here, the format DCIo of the first channel PDCCH1 comprises the same number of bits as a format described in the standard 3GPP LTE for signaling the resources allocated to a terminal in an LTE network, so as to facilitate its decoding by the interferer terminal T1. For example, it comprises the some number of bits as a format 1A as defined in the document TS 36.212.

In another embodiment, the DCI format of the first channel PDCCH1 comprises a number of bits less than that of the DCI formats defined in the document TS 36.212 of the 3GPP.

Figure 6B:
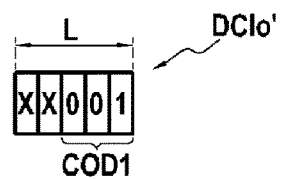

An example of such a format denoted DCIo' is illustrated in FIG. 6B. It comprises a reduced number L of bits, chosen so as to be sufficient to be able to include the condensed representation of the open temporary identifiers allocated to the interferer terminals (in this case L=3 suffices in the examples considered previously).

The terminal T1, meanwhile, monitors in a conventional manner (i.e. as defined in the standard 3GPP LTE), at each transmission time interval (TTI), the search space corresponding to its dedicated temporary identifier RNTI1.

Thus, on reception of the control channel PDCCH1 on the research space corresponding to the dedicated identifier RNTI1, the terminal T1 decodes the channel PDCCH1 using this identifier RNTI1, in a manner known per se (step F20).

It then verifies if the DCI format of the channel PDCCH1 thus decoded coincides with the format DCIo expressing the fact that an open temporary identifier is allocated to the terminal T1 in this channel PDCCH1, and prompting it to decode another PDCCH channel using this open temporary identifier in this same TTI (test step F30).

If the DCI format of the channel PDCCH1 does not coincide with the format DCIo (reply no to the test step F30), but with a DCI format defined in the 3GPP LTE standard, this means that the channel PDCCH1 is not intended to allocate an open temporary identifier to the terminal T1 but concerns transmission parameters allocated to it (step F40). The terminal T1 then uses these transmission parameters in a manner known per se to communicate over the network NW.

On the other hand, if the terminal T1 detects that the DCI format of the channel PDCCH1 coincides with the predetermined format DCIo (reply yes in the test step F30), this is interpreted by the terminal T1 as an order to decode another PDCCH channel transmitted in the same TTI using the open identifier signaled in the "Chp RNTIo" field of the channel PDCCH1, by way of its condensed representation COD1.

The terminal T1 extracts the condensed representation COD1 from the decoded channel PDCCH1.

It then determines from this condensed representation the open temporary identifier RNTIo1 that is allocated to it (step F50).

For this purposes, in the embodiment described here, it uses the correspondence signaled by the base station BS1 in step E10.

In another embodiment of the invention, this correspondence between the open identifiers and their condensed representations, and a fortiori between the identifier RNTIo1 and its condensed representation COD1, can be signaled by the base station BS1 to the terminal T1 in a dedicated RRC signaling message.

In yet another embodiment, this correspondence between the open identifiers and their condensed representations, and a fortiori between the identifier RNTIo1 and its condensed representation COD1, can be deduced by the terminal T1 from a signaling message (such as for example by a signaling message emitted over a shared channel PDSCH) containing the list of open identifiers and emitted by the base station BS1 towards the terminals attached to its cell (for example when the condensed representation of an open temporary identifier corresponds to its ranking in the list).

In the same transmission time interval as the channel PDCCH1, the base station BS1 emits a second physical control channel PDCCH2 allocating parameters and transmission resources (notably one or more modulation and coding schemes MCS and PRB blocks) to the interferer terminal T1. The way in which these resources are allocated properly speaking to the terminal T1 is known per se and is in accordance with the practices defined in the 3GPP standard for the LTE network.

The DCI format of the second physical control channel PDCCH2 is one of the formats defined in the 3GPP standard, for example any one of the DCI formats 2, 2A, 2B, 2C or 2D defined in the document 3GPP TS 36.212.

In accordance with the invention, this second channel PDCCH2 is coded using the open temporary identifier RNTIo1 allocated to terminal T1 (step E70 in FIG. 4).

Note that the PDCCH channels associated with the open RNTI identifiers, being intended to be decoded by interfered terminals (for example by terminal T2) in poor radio conditions from the point of view of the cell C1 (since they are served by another cell C2), generally need strong protection. This results in the use of a high aggregation factor to form these channels, i.e. each PDCCH channel intended for an open RNTI identifier is preferentially formed with a high number of elements or CCE (for Control Channel Element) (in an LTE network, according to the considered level of protection of the PDCCH, a PDCCH channel can generally be formed by 1, 2, 4 or 8 CCE). The number of combinations of candidate resources to be tested during the search for PDCCH channels by the terminal T2, which depends on this aggregation factor, will thus be relatively small. The additional complexity related to the invention can consequently be limited.

It is also possible to deliberately reduce the number of DCI formats eligible to be transmitted using an open RNT1 identifier, in order to limit the complexity of the search of the PDCCH channels performed by the interfered terminals. A slight increase in the search complexity can however by tolerated for terminals capable of carrying out a MMSE-SIC reception, because the latter will be provided with greater computational capacity. In order for this increase in complexity to avoid harming other terminals notwithstanding, it is possible to use open RNTI identifiers only for terminals capable of implementing interference cancellation using an MMSE-SIC technique.

Following the decoding of the channel PDCCH1, the terminal T1 conventionally monitors (i.e. as defined in the 3GPP standard), for the transmission time interval in progress, the search space corresponding to the open temporary identifier RNTIo1 allocated by the base station BS1 in the channel PDCCH1.

Thus, on receiving the control channel PDCCH2 on the search space corresponding to the open identifier RNTIo1, the terminal T1 decodes the channel PDCCH2 using the open identifier RNTIo1, in a manner known per se (step F60 in FIG. 5).

It then extracts the transmission parameters contained in this channel, then from that point uses, over the transmission time interval in progress, the resources designated by these transmission parameters when communicating over the network NW (step F70).

It is assumed that in the same time (i.e. in the same TTI), the cell C2 serves the terminal T2, able to employ a MMSE-SIC receiver as described previously.

The terminal T2 has moreover been informed by the base station BS2 of the list of open identifiers (containing in particular the open identifier RNTIo1) selected by the base station BS1 and intended for the interferer terminals of the cell C1 capable of interfering with the communications of other terminals (including those of cell C2 in particular).

The terminal T2 decodes, using its dedicated temporary identifier RNTI2 (allocated by the base station BS2 in a manner known per se), the PDCCH channels that are transmitted to it in this TTI over the search space associated with this identifier. While detecting that data are intended to it in this TTI, the terminal T2 attempts to decode the PDCCH channels potentially transmitted by the base station BS1 over the search spaces corresponding to the open identifiers which it was informed, and in particular over the search space corresponding to the identifier RNTIo1.

Where applicable (i.e. if it detects and decodes a PDCCH channel associated with the open identifier RNTIo1, such as for example the channel PDCCH2), this decoding advantageously allows the terminal T2 to identify the transmission parameters allocated to the terminal T1 on this TTI, and to determine if the resources used by the terminal T1 to communicate over the network NW deduced from these parameters coincide or correspond (in part only or totally), with the resources that it uses itself to communicate. This decoding allows the terminal T2 to determine whether or not the terminal T1 is an interferer and if it must attempt to cancel the interference generated by T1 using its MMSE-SIC receiver, taking into account the transmission parameters allocated to the terminal T1 for this same TTI.

Where applicable, the terminal T2 can then, using the knowledge of these transmission parameters, decode the interfering signal of the terminal T1 with success then cancel the corresponding interference which makes it possible to improve the quality of its radio link for the detection of the useful signal that is intended for it.

In other words, the invention facilitates the application of interference cancellation techniques in the case where an intercellular interference exists between two terminals, and this on condition of reasonable complexity in terms of signaling.

Note that the DCI format of the channel PDCCH1 has no effect on the terminal T2 since this channel is encoded using the dedicated identifier RNTI1 of the terminal T1 and not using the open identifier RNTIo1.

Moreover, in order to improve the performance of the system 1 and the interference cancellation, it is possible to employ prior coordination between the base stations BS1 and BS2 to ensure that the coding and modulation scheme of the terminal T1 is decodable by the terminal T2 (during the application of the interference cancellation method), and that the data rate offered to the terminal T2 takes into account the improved performance of the terminal T2 due to the interference cancellation via the knowledge of the transmission parameters allocated to T1 easily allowed by the invention. The terminal T2 can thus receive a better instantaneous data rate in this TTI than if it had only employed one linear receiver.

Note that all the terminals of the cell C1 do not necessarily consume enough resources to generate interference damaging to the communications of terminal T2, and that therefore needs cancelling. Indeed, if the terminal T2 is served on a high number of PRB resource blocks (for example 25) but is interfered on by the transmission of one PRB resource block of the cell C1 to the terminal T1, this interference causes few damages and does not necessarily require the application of an MMSE-SIC receiver to reduce it. The terminals that do not need to receive a PDCCH channel decodable by other terminals can be constantly served on their dedicated RNTI identifier. These terminals can be advantageously configured to not have to search their PDCCH channel according to a predefined format indicating an open temporary network identifier, which makes it possible to save on their battery consumption.

As mentioned previously, the example illustrated with reference to FIGS. 1-6 concerns the cancellation of intercellular interference between two terminals T1 and T2 served by base stations BS1 and BS2 controlling separate neighbor cells C1 and C2. However, the invention is also applicable in a context in which one seeks to cancel an interference of MU-MIMO type generated within one and the same cell (for example by the communications from the terminal Ti on the communications of the terminal T1'). Similar steps to those described previously for the cancellation of intercellular interference can then be employed, on condition of the publication of the list of open RNTI identifiers to the terminals attached to the cell C1 (such as for example to the terminal T1').

Similarly, the invention is also applicable in a context in which both intercellular interference and MU-MIMO interference must be cancelled.

The invention claimed is:

1. A signaling method for implementation by a base station of a cellular telecommunications network, this base station controlling at least one cell of the network to which is attached at least one terminal uniquely identified on this cell by a dedicated temporary network identifier, the signaling method comprising:
   allocating an open temporary network identifier, to an interferer terminal identified by the base station from among said at least one terminal attached to the cell as being capable of interfering with at least one communication established by another terminal attached to this cell or to a neighbor cell of this cell;
   publishing this open temporary network identifier;
   sending a first physical control channel according to a predetermined format to the interferer terminal comprising a condensed representation of the open temporary network identifier allocated to the interferer terminal, this first physical channel being coded using the dedicated temporary network identifier of the interferer terminal; and
   sending a second physical control channel to the interferer terminal allocating it transmission resources over the cellular network, this second channel being coded using the open temporary network identifier.

2. The signaling method according to claim 1, wherein the process of publishing the open temporary network identifier comprises broadcasting this identifier to the terminals attached to said cell and/or to the terminals attached to at least one other cell controlled by the base station and neighbor of said cell.

3. The signaling method according to claim 1, wherein the publishing of the open temporary network identifier comprises broadcasting this identifier to at least one other base station controlling a neighbor cell of the cell.

4. The signaling method according to claim 1, further comprising broadcasting a message on said cell comprising a correspondence between the open temporary network identifier and its condensed representation.

5. The signaling method according to claim 1, further comprising sending a dedicated signaling message to the interferer terminal managed by a radio resource management layer, this dedicated signaling message comprising a correspondence between the open temporary network identifier and its condensed representation.

6. The signaling method according to claim 1, wherein the format of the first physical control channel comprises a field containing a sequence of predetermined bits.

7. The signaling method according to claim 1, wherein the format of the first physical control channel comprises a number of bits less than a format of the second physical control channel.

8. The signaling method according to claim 1, wherein the cellular telecommunications network is an LTE (Long Term Evolution) network and:
   the open temporary network identifier and the dedicated temporary network identifier allocated to the interferer terminal are identifiers of RNTI (Radio Network Temporary Identifier) type; and
   the first and the second physical control channel are PDCCH channels (Physical Downlink Control CHannel).

9. The signaling method according to claim 5, wherein the dedicated signaling message is an RRC (Radio Resource Control) signaling message.

10. A computer having stored thereon instructions which, when executed by the computer, cause the computer to perform the signaling method of claim 1.

11. A non-transitory data storage medium readable by a computer on which is stored a computer program comprising instructions for executing the steps of the signaling method according to claim 1.

12. A base station of a cellular telecommunications network, controlling at least one cell of the network to which is attached at least one terminal uniquely identified on this cell by a dedicated temporary network identifier, this base station comprising a processor and a memory, wherein the processor:
   allocates an open temporary network identifier to an interferer terminal identified from among said at least one terminal attached to the cell as being capable of interfering with at least one communication established by another terminal attached to this cell or to a neighbor cell;
   publishes this open temporary network identifier;
   sends a first physical control channel according to a predetermined format to the interferer terminal, comprising a condensed representation of this open temporary identifier, such that said first physical channel can be coded using the dedicated temporary network identifier of the interferer terminal; and
   sends a second physical control channel to the interferer terminal allocating it transmission resources over the cellular network, such that said second physical channel can be coded using the open temporary network identifier allocated to the interferer terminal.

13. A communication method for implementation by an interferer terminal attached to a cell of a cellular telecommunications network and uniquely identified in this cell by a dedicated temporary network identifier, said cell being controlled by a base station, and the interferer terminal being capable of interfering with at least one communication established by another terminal of said cell or of a neighbor cell to this cell, the communication method comprising:

decoding a first physical control channel using the dedicated temporary network identifier, this first physical control channel having a predetermined format and comprising a condensed representation of a open temporary network identifier allocated to the interferer terminal by the base station and published or intended to be published by the latter;

on detection of the predetermined format of the first physical control channel:
determining the open temporary network identifier allocated to the interferer terminal from said condensed representation contained in the first physical channel; and
decoding a second physical control channel using the open temporary network identifier thus determined, this second physical control channel allocating transmission resources for transmission over the cellular network to the interferer terminal; and using the transmission resources allocated in this second channel to communicate over the cellular network.

14. A terminal attached to a cell of a cellular telecommunications network and uniquely identified on this cell by a dedicated temporary network identifier, said cell being controlled by a base station and said interferer terminal being capable of interfering with at least one communication established by another terminal attached to said cell and/or to a neighbor cell to said cell, said terminal comprising a processor and a memory, wherein the processor:

decodes a first physical control channel using the dedicated temporary network identifier, this first physical control channel having a predetermined format and comprising a condensed representation of an open temporary network identifier allocated to the interferer terminal by the base station, and published or intended to be published by the latter;

on detection of the predetermined format of the first physical control channel, determines the open temporary network identifier from the condensed representation contained in the first physical control channel;

on detection of the predetermined format of the first physical control channel, decodes a second physical control channel using the determined open temporary network identifier, this second physical control channel allocating transmission resources over the cellular network to the interferer terminal; and uses the transmission resources allocated in this second channel for communicating over the cellular network.

15. A system of a cellular telecommunications network comprising:

a base station according to claim 12 controlling at least one cell of the cellular telecommunications network;

an interferer terminal according to claim 14 attached to said cell; and a terminal interfered on by said interferer terminal, said interfered terminal being attached to the cell of the interferer terminal or to a neighbor cell of the network, and able to implement an interference cancellation technique using the open temporary network identifier allocated to the interferer terminal and published by the base station.

16. The signaling method according to claim 1, wherein the dedicated temporary network identifier is reserved to the interferer terminal and uniquely identifies the interferer terminal on the cell controlled by the base station.

17. The base station according to claim 12, wherein the dedicated temporary network identifier is reserved to the interferer terminal and uniquely identifies the interferer terminal on the cell controlled by the base station.

18. The communication method according to claim 13, wherein the dedicated temporary network identifier is reserved to the interferer terminal and uniquely identifies the interferer terminal on the cell controlled by the base station.

19. The terminal according to claim 14, wherein the dedicated temporary network identifier is reserved to the interferer terminal and uniquely identifies the interferer terminal on the cell controlled by the base station.

* * * * *